*Knight, Smith, & Bercaw,*
*Horse Rake.*
No. 87,267.     Patented Feb. 23, 1869.
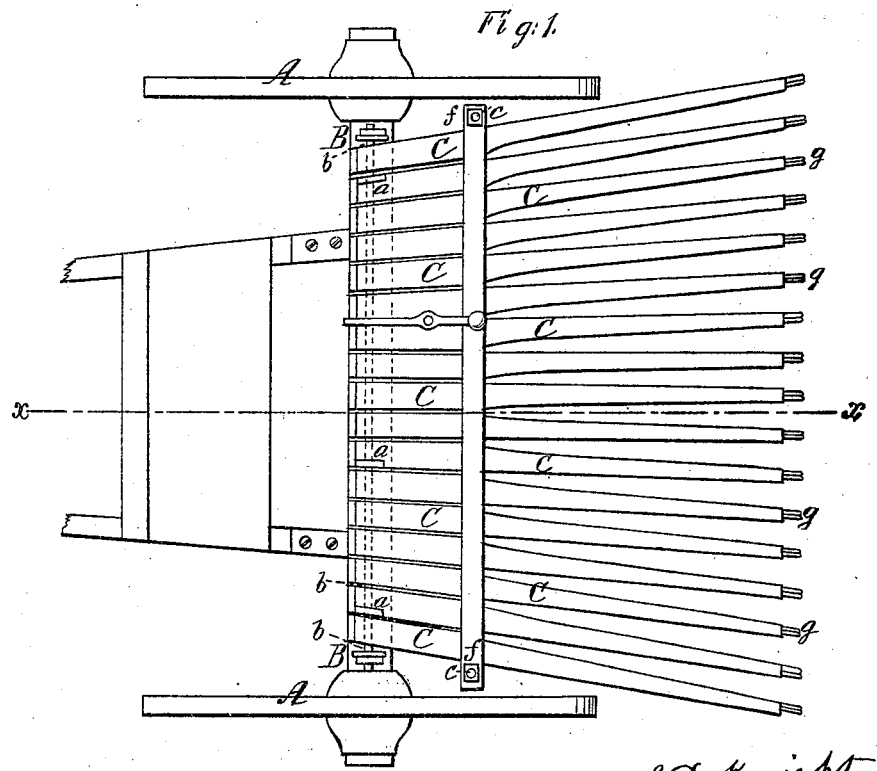
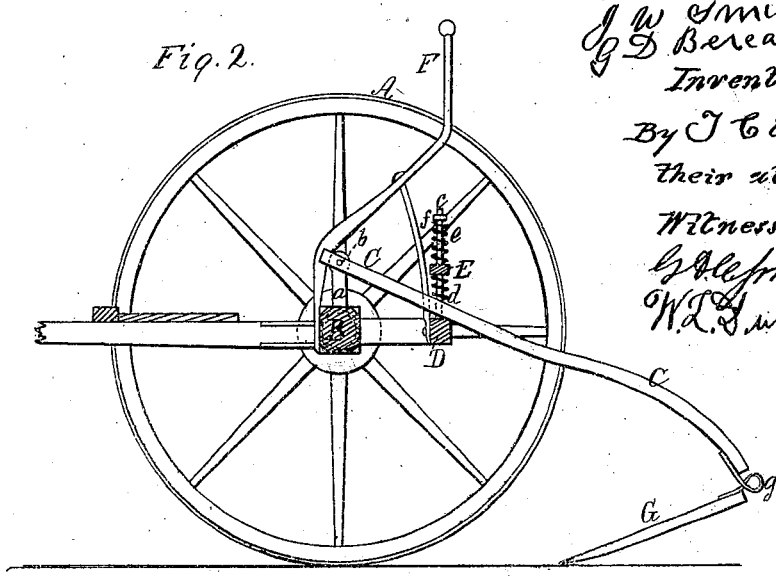

SAMUEL D. KNIGHT, J. W. SMITH, AND GEORGE W. BERCAW, OF BRYAN, OHIO.

Letters Patent No. 87,267, dated February 23, 1869.

IMPROVEMENT IN HORSE-RAKES.

The Schedule referred to in these Letters Patent and making part of the same.

*To all whom it may concern:*

Be it known that we, SAMUEL D. KNIGHT, J. W. SMITH, and GEORGE W. BERCAW, of Bryan, in the county of Williams, and State of Ohio, have invented a new and useful Improvement in Hay-Rakes; and we do hereby declare that the following is a full, clear, and exact description thereof, reference being had to the accompanying drawing, in which—

Figure 1 is plan view, and

Figure 2 is a vertical section, taken in the line $x\,x$ of fig. 1.

The nature of our invention consists in the peculiar form of the rake-heads, or arms, and the manner of connecting them to the teeth, as hereinafter described.

To enable those skilled in the art to make and use our invention, we will proceed to describe its construction and operation.

The rake is mounted on wheels A A, which are on the axle B, on the top of which are standards $a$.

In the upper ends of these standards are holes, through which the rod $b$ passes.

In the upper end of the curved rake-heads, or arms, C, are holes through which the rod $b$ also passes, thus securing them to the standards on the axle B.

Back of the axles, and under the rake-heads, is a bar, D, which is parallel to the axle, and connected to it by bars or rods, as seen in fig. 2.

At each end of the bar D are secured rods $c\,c$.

On each of these rods are spiral springs $d$, which extend above the rake-heads C.

The draw-bar E rests on these springs, there being a hole in each end of it, which allows the rods $c\,c$ to pass through it.

On top of this, on the rods $c\,c$, are spiral springs $e\,e$, the whole being held in place by the nuts $f\,f$.

F represents a lever, which is attached to the axle B and bar D, as shown in fig. 2.

Each of the teeth G is attached to the rake-heads C by a coil-spring, $g$, the points resting on or near the ground, the position of the teeth, while in operation, being about as represented in fig. 2.

When the rake is being used, should one of the teeth strike an obstruction, it will raise the rake-head, to which it is attached, and it will strike the draw-bar E, which will also yield, being allowed to do so by the springs $e\,e$. When the arm has reached this position, the tooth will be nearly vertical, and being connected to the rake-head by a spring, it will also yield and pass over the obstruction.

The lower portions of the rake-heads, or arms, C, are curved upward, about as represented in the drawing, to allow more room for the hay which collects on the teeth G.

When the rake is filled, and it is desired to discharge the hay, the operator, by throwing forward the lever F, raises the rake-heads C and teeth G, and discharges the hay which has accumulated on the teeth, and by releasing the lever F, the parts will resume their former positions.

Having thus fully described our invention,

What we claim, and desire to secure by Letters Patent, is—

The arrangement of the rake-arms C, in combination with the teeth G, springs $g$, bar D, and springs $d$ and $e$, substantially as set forth and described.

SAMUEL D. KNIGHT.
J. W. SMITH.
GEORGE W. BERCAW.

Witnesses:
THOS. J. YOUNG,
F. M. CARTER.